UNITED STATES PATENT OFFICE.

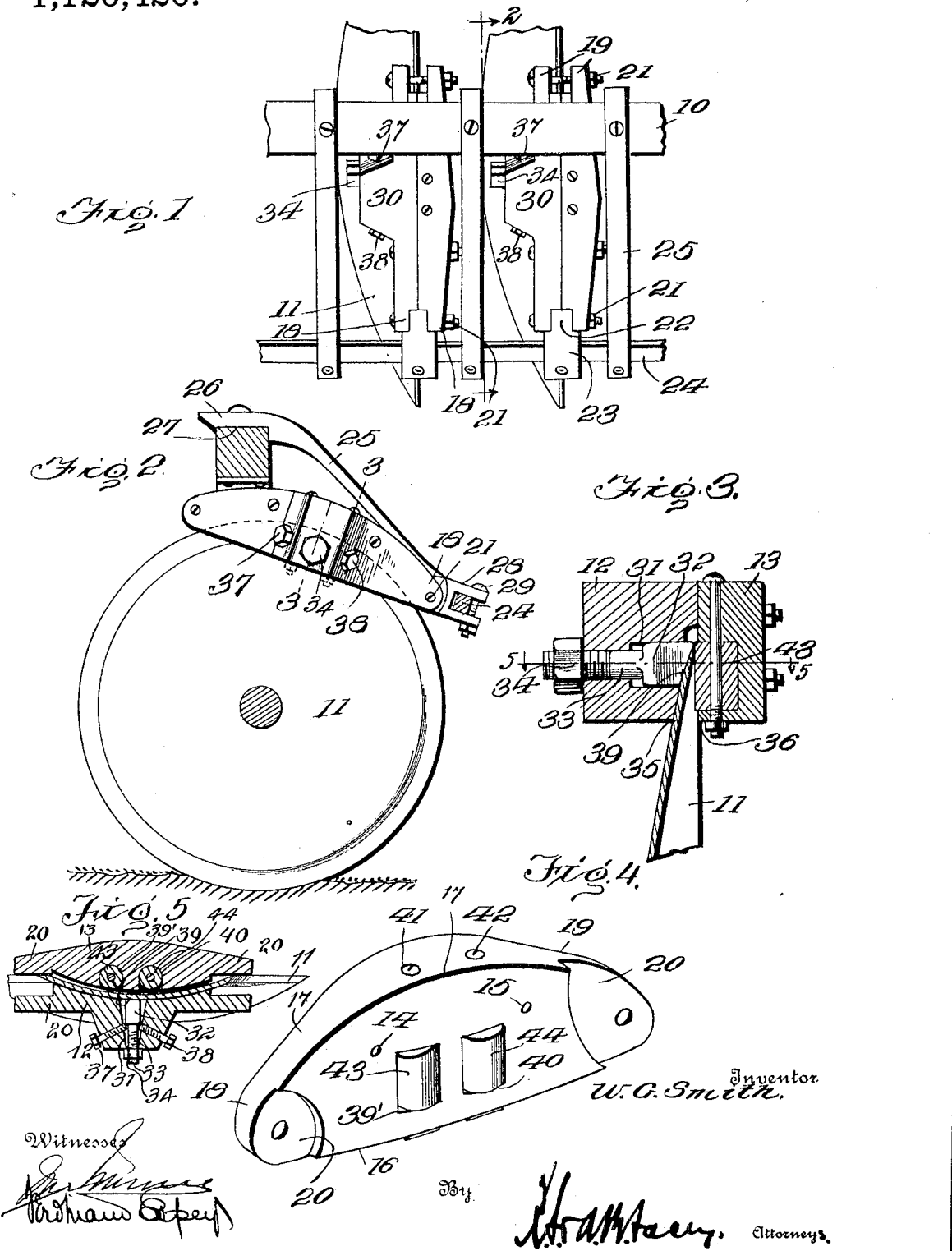

WILLIAM G. SMITH, OF ENGLEWOOD, KANSAS.

DISK-SHARPENER.

1,120,420.   Specification of Letters Patent.   Patented Dec. 8, 1914.

Application filed January 15, 1913. Serial No. 742,307.

*To all whom it may concern:*

Be it known that I, WILLIAM G. SMITH, citizen of the United States, residing at Englewood, in the county of Clark and State of Kansas, have invented certain new and useful Improvements in Disk-Sharpeners, of which the following is a specification.

This invention relates to disk sharpeners.

The primary object of the invention is to provide a sharpening device for cultivator disks which may be supported by the cultivator frame, the arrangement being such that the disk is supported adjacent the sharpening device in order to secure the proper sharpening of the same.

A further object of the invention is to provide a sharpening device in which the disk will be supported at the point where it is sharpened, the face of the disk remote from that which is sharpened being supported by rollers in order that the sharpening may be accomplished without undue friction where the unsharpened face of the disk contacts with the holder.

A still further object of the invention is to provide a sharpener supporting mechanism which may be adjusted with respect to the cultivator frame in order to accommodate different size disks.

Another object of the invention is to provide a holder for the sharpening device, the position of which may be reversed in order to contact with both faces of the disk or in instances where the disks are reversed.

In the drawings: Figure 1 is a plan view showing a portion of the cultivator frame; Fig. 2 is a section on the line 2—2 of Fig. 1; Fig. 3 is a section on the line 3—3 of Fig. 2; Fig. 4 is a perspective view of one of the members which constitute the support; Fig. 5 is a horizontal sectional view taken on the line 5—5 of Fig. 3.

In the drawings, 10 designates the beam of a cultivator. The shaft on which the disks 11 are mounted is disposed below this beam, whereby the peripheries of the disks pass beneath the beam.

The sharpener consists of sections 12 and 13 which are bolted together at their terminals and at the points 14 and 15. Each of the members is formed with a straight bottom edge 16 and a curved top edge 17, the terminals 18 and 19 being reduced in thickness, as shown at 20, and apertured to receive bolts 21. It will be noted by this construction that when the members are secured together that their terminals will be spaced, forming a socket for the extension 22 of the block 23. This block 23 is secured to a beam 24 which is disposed parallel with the cultivator beam 10 and which is connected to said beam by the curved arms 25, the terminals 26 of said arms being cut-away as at 27 and bolted or otherwise secured to the beam 10. The extension 22 of the block 23 is apertured to receive the bolt 21, thereby forming a hinged connection between the members and the block.

The blocks 23 are formed with extensions 28 which embrace the beam 24 and bolts 29 pass through the extensions 28, the block in this manner being supported on the beam. While the block is supported against movement longitudinally of the beam, it will be noted that in adjusting the members that the bolt may be loosened and the block positioned at any desired point throughout the length of the beam.

The member 12 is formed with an enlargement 30, the inner face of the member being provided with a recess 31 which receives the sharpening chisel 32, the chisel being movable transversely of the member within said recess. The chisel is provided with a shank portion 33 and is adjusted transversely of the member by means of a nut 34 screw threaded upon the outer extremity of the shank portion 33. The lower portion of the inside face 35 of the member 12 is curved throughout its length to conform to the curvature of the disk 11. The lower portion of the inside face 36 of the section 13 is also curved throughout its length to conform to the curvature of the disk, this construction effectually supporting the disk when engaged by the chisel without causing the disk to move longitudinally of its supporting shaft. The recess 31 is sufficiently large to allow for adjustment of the chisel longitudinally of the member 12 as well as transversely, this longitudinal movement being secured by set-screws 37 and 38 which extend into the recess and bear by their inner extremities against the opposite sides of the adjacent extremity of the head of the chisel, the bevel face 39 thereof in this manner being adjusted with respect to the disk.

The section 13 is provided at points adjacent the center with recesses 39′ and 40 disposed in spaced relation and extending transversely of the member. Bolts 41 and 42 extend transversely through the member 13, said bolts extending through the recesses 39 and 40 and supporting rollers 43 and 44. The rollers are disposed adjacent the lower edge 16 of the member and are arranged on either side of the chisel 32. It will be noted by this construction that at the point where the chisel bears against the disk that the face of the disk remote from the chisel will be supported by the rollers, the desired pressure on the disk at this particular point being secured, the rollers extending beyond the inner face of the member 13.

It will be noted that the portions of the device which are subject to wear, that is, the chisel and the rollers, may be readily renewed when worn, and that the pressure on the disk while it is being sharpened is only at the actual point where the chisel contacts with the disk and not throughout the entire length of the holder. It will therefore be seen that the holder receives and supports the disk, the sharpening being accomplished without distorting the disk or causing movement of the same longitudinally of the shaft on which it is mounted. Attention is called to the fact that the sharpening of the disk may be accurately regulated by the adjustment of the chisel, and that as the supporting member is hingedly mounted it may be raised out of contact with the disk if desired.

When the disks are reversed on the shaft, the members 12 and 13 may be reversed with respect to the block 23, accommodating the disks regardless of their position on the disk supporting shaft. The free ends 19 of the members are disposed beneath the beam 10, thus being prevented from accidental rising out of position with respect to the disk. It will be clearly apparent that as the members are hingedly supported they may be adjusted to various size disks, and that the supporting structure is such as to permit the device to be placed on cultivators or disk plows regardless of their construction. It will also be seen that the construction is such as may be easily and economically manufactured, and that the various parts may be readily assembled.

Having thus described my invention, what I claim as new and desire to secure by Letters Patent is:

1. A sharpener for disk cultivators comprising a pivotally supported member formed in sections, the disk being disposed to rotate between the sections, an adjustable sharpening device supported by one of the sections, and rollers supported by the other section and contacting with the disk on both sides of the sharpening device.

2. A disk sharpener for cultivators comprising a supporting member, said supporting member being formed in sections, one of the sections being formed with a recess, a chisel adjustably supported within said recess, means for moving said chisel transversely and longitudinally of the supporting member, rollers carried by the other section, said rollers being disposed in spaced relation and arranged to contact with the face of the disk remote from that with which the chisel contacts, the chisel contacting with the disk intermediate of the rollers.

3. A disk sharpener for cultivators comprising a supporting member, said member being formed in sections, the disk being received between the sections, the faces of the sections adjacent the disk being curved longitudinally to conform to the shape of the disk, a sharpening member adjustably supported by one of the members and contacting with one face of the disk, and rollers supported by the other member and contacting with the other face of the disk.

4. A sharpener for disk cultivators comprising a supporting member, rollers mounted on said supporting member in spaced relation, an adjustable sharpening device carried by the member and disposed adjacent the rollers, the disk to be sharpened traveling between the rollers and said sharpening device, the rollers contacting with one face of the disk, and the sharpening device with the other face, the sharpening device being active to the disk intermediate the rollers.

5. A disk sharpener including a supporting member, a roller carried by said member, a chisel carried by the supporting member, means for adjusting the chisel toward or away from the roller, and independent means for adjusting the chisel transversely of the roller.

6. A disk sharpener including a supporting member recessed to receive a disk, a roller carried by said member and arranged to extend into the recess, a chisel carried by the supporting member, means for adjusting the chisel toward or away from the roller, and independent means for adjusting the chisel transversely of the roller.

7. A disk sharpener including a supporting member, a roller carried by said member, said member having a recess formed therein, a chisel mounted in said recess, means for adjusting the chisel toward or away from the roller, and independent means for adjusting the chisel transversely within the recess.

8. A disk sharpener including a supporting member, a roller carried by said member, the member having a recess formed therein, a chisel mounted in said recess, said chisel being formed with a shank having a head formed thereon presenting a working face, the shank of the chisel extending exteriorly of the supporting member and having a nut screw threaded thereon adapted to adjust the chisel toward or away from the roller, and set screws carried by the member and extending into the recess formed therein to engage the head of the chisel, said screws being adapted to adjust the working face of the chisel transversely of the roller.

In testimony whereof I affix my signature in presence of two witnesses.

WILLIAM G. SMITH. [L. S.]

Witnesses:
CECIL W. NEWBY,
E. N. MARTEL.

Copies of this patent may be obtained for five cents each, by addressing the "Commissioner of Patents, Washington, D. C."